(12) United States Patent  
Nakao

(10) Patent No.: US 7,428,117 B2  
(45) Date of Patent: Sep. 23, 2008

(54) SERVO SIGNAL INSPECTING DEVICE AND METHOD FOR INSPECTING SERVO SIGNAL

(75) Inventor: Toru Nakao, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 226 days.

(21) Appl. No.: 11/213,720

(22) Filed: Aug. 30, 2005

(65) Prior Publication Data

US 2006/0061898 A1     Mar. 23, 2006

(30) Foreign Application Priority Data

Sep. 21, 2004   (JP)   ............... 2004-272903

(51) Int. Cl.  
    *G11B 15/46*   (2006.01)

(52) U.S. Cl. ............... 360/73.01; 360/51; 360/77.12; 360/75

(58) Field of Classification Search ............... None  
See application file for complete search history.

(56) References Cited

U.S. PATENT DOCUMENTS

| | | | |
|---|---|---|---|
| 3,678,220 A | 7/1972 | Luhrs | |
| 5,689,384 A | 11/1997 | Albrecht et al. | |
| 5,852,535 A * | 12/1998 | Richardson et al. | 360/77.12 |
| 5,930,065 A | 7/1999 | Albrecht et al. | |
| 6,021,013 A * | 2/2000 | Albrecht et al. | 360/53 |
| 6,122,124 A * | 9/2000 | Fasen et al. | 360/51 |
| 6,124,996 A | 9/2000 | Fasen et al. | |
| 6,172,833 B1 | 1/2001 | Fry et al. | |
| 6,282,051 B1 * | 8/2001 | Albrecht et al. | 360/75 |
| 6,320,719 B1 | 11/2001 | Albrecht et al. | |
| 6,754,026 B1 * | 6/2004 | Koski | 360/73.04 |
| 6,999,258 B2 * | 2/2006 | Molstad et al. | 360/48 |
| 7,196,859 B2 * | 3/2007 | Olson | 360/29 |
| 2003/0095353 A1 * | 5/2003 | Nakao | 360/75 |
| 2004/0091746 A1 | 5/2004 | Nakamura et al. | |
| 2004/0141250 A1 * | 7/2004 | Harper et al. | 360/71 |
| 2005/0105967 A2 | 5/2005 | Nakao | |

(Continued)

FOREIGN PATENT DOCUMENTS

EP     0690442 A2     1/1996

(Continued)

OTHER PUBLICATIONS

Barrett R C et al: "Timing-Based Track-Following Servo for Linear Tape Systems" IEEE Transactions on Magnetics, IEEE Service Center, New York, NY, US, vol. 34, No. 4, Part 1, Jul. 1998, pp. 1872-1877, XP000833231 ISSN: 0018-9464 *the whole document*.

*Primary Examiner*—Hoa T. Nguyen  
*Assistant Examiner*—Dismery Mercedes  
(74) *Attorney, Agent, or Firm*—Sughrue Mion, PLLC

(57) ABSTRACT

A servo signal inspection device and a method for detecting servo signal are provided which can measure and evaluate quality of the servo signal on a magnetic tape with a sufficient resolution. The device includes a servo signal inspecting head, a peak detecting means, a time interval measuring means and an inspection means, wherein a period T [s] of a standard clock signal used in the time interval measuring means and a running speed v [m/s] of the magnetic tape at the servo signal inspecting head satisfy the following relationship: T×v<80 nm.

11 Claims, 4 Drawing Sheets

U.S. PATENT DOCUMENTS

2005/0254163 A1  11/2005  Nakao

FOREIGN PATENT DOCUMENTS

| JP | H9161250 A | 6/1997 |
| JP | H10334435 A | 12/1998 |
| JP | 2000123335 A | 4/2000 |
| JP | 2003-141836 A | 5/2003 |
| JP | 2004-318977 A | 11/2004 |
| JP | 2005085442 A | 3/2005 |

* cited by examiner

SERVO SIGNAL INSPECTING DEVICE AND METHOD FOR INSPECTING SERVO SIGNAL

BACKGROUND OF THE INVENTION

1. Field of the Invention

The present invention relates to a servo signal inspecting device and a method for inspecting a servo signal.

2. Description of the Related Art

Magnetic tape is widely used as recording medium for reproducibly recording data. In such a magnetic tape, in order to increase recording density per unit area, a number of data bands for recording data are formed along the magnetic tape and packed in a width direction of the magnetic tape. For various reasons, the magnetic tape repeatedly and slightly shifts in the width direction during running, and it may become difficult for a recording/reproducing head to completely trace the data bands during recording/reproducing of data. Therefore, in this type of device for recording/reproducing data onto/from a magnetic tape, during recording/reproducing of data, tracking of data bands of the magnetic tape by the recording/reproducing head is dynamically controlled based on a servo signal which has been written in advance on the magnetic tape. Specifically, a servo signal read head integrally formed with the recording/reproducing head reads the servo signal to detect deviation of the recording/reproducing head in the width direction from the normal position, and based on the detected deviation the recording/reproducing head is moved to cancel the deviation, so that the magnetic tape is properly tracked and running condition of the magnetic tape is controlled. Such a servo signal is written in advance by a specific servo writer in a running direction of the magnetic tape (see, for example, Unexamined Japanese Patent Publication No. 2003-141836 (paragraphs 0002-0005)).

As for the servo signal, timing based servo (hereinbelow, simply referred to as "TBS") signal is known. As shown in FIG. 2A, this TBS signal is written on servo bands SB1, SB2, SB3, SB4 and SB5 on a magnetic recording surface of the magnetic tape MT, with adjacent two servo bands flanking data bands DB1, DB2, DB3 and DB4, respectively. The servo signals written on the servo bands SB1, SB2, SB3, SB4 and SB5 are retrieved by the servo signal read head that slidably contacts with the magnetic tape MT while the magnetic tape MT is run by a tape running system. For example, as shown in FIG. 2B, one unit of the TBS signal is formed of a nonparallel pair of servo pattern sets each set composed of 5 servo patterns (SP1A, SP1B, SP1C, SP1D and SP1E; and SP2A, SP2B, SP2C, SP2D and SP2E), and another nonparallel pair of servo pattern sets each set composed of 4 servo patterns (SP3A, SP3B, SP3C and SP3D; and SP4A, SP4B, SP4C and SP4D), which unit is written on the servo band SB at a predetermined spacing along a running direction A of the magnetic tape MT. An interval between the servo pattern set SP1A, SP1B, SP1C, SP1D and SP1E and the servo pattern set SP2A, SP2B, SP2C, SP2D and SP2E, and an interval between the servo pattern set SP1A, SP1B, SP1C, SP1D and SP1E and the servo pattern set SP3A, SP3B, SP3C and SP3D are measured by means of a time interval of pulse peaks of the servo signals reproduced by the servo signal read head. In accordance with the results, running condition of the magnetic tape is controlled. For example, as shown in FIG. 2C, time intervals are measured, such as a time interval $AB_0$ between the pulse peak PA1 in the servo pattern SP1A and the pulse peak PB1 in the servo pattern SP2A, and a time interval $AC_0$ between the pulse peak PA1 in the servo pattern SP1A and the pulse peak PC1 in the next servo pattern SP3A. Subsequently, the ratio $AB_0/AC_0$ is calculated, and in accordance with the results, running condition of the magnetic tape is controlled.

In the process of manufacturing and inspecting the magnetic tape for servo system utilizing such a TBS signal for tracking control, a servo signal is written on the magnetic tape, and at the same time it is necessary to read the servo signal and to examine the precision of the servo signal, in order to evaluate quality of the written servo signal.

In general, the above-mentioned measurement of the time interval between the pulse peaks is performed by comparing a standard clock and timing of the pulse peaks. Therefore, the precision of the servo signal measuring system in the servo signal inspecting device mainly depends on the precision of the standard clock used for measuring the peak interval. Generally, in a servo signal inspecting device on the magnetic tape for the servo system utilizing TBS signal, the minimum resolution in the measuring system is defined as $L_{clk}=T\times v$ [m], where T [s] is a period of the standard clock for measuring the time interval between peak pulses, v [m/s] is the running speed of the tape in the tape running system, and $L_{clk}$ is a length of the magnetic tape per unit clock by the standard clock. For example, when the time interval between the peaks is measured at the running speed of 5 m/s and with the standard clock signal of 50 MHz, the minimum resolution per standard clock is obtained as follows: 20 ns×5 m/s=100 nm. In the case of the conventional magnetic tape with the track pitch of approximately 20-30 μm, when the above-mentioned level of resolution is used for measuring the time interval of the peak pulses, quality of the servo signal is inspected with a sufficient precision.

On the other hand, much higher capacity is demanded in the magnetic tape used with recent data recording/reproducing system. To meet this demand, some methods for narrowing the tracks have been proposed. For example, in unpublished Japanese patent application No. 2004-145136, the present inventor previously has proposed a method in which an angle between the two (nearly inverted V-shaped) sets of the servo patterns of the TBS signal is widened; and also in Japanese unexamined patent laid-open application publication No. 2004-318977, the present inventor previously has proposed a method in which S/N ratio of the servo signal is improved by the use of a DC write (writing with direct current magnetization). Another example includes a method in which Mrt of the magnetic tape is reduced. With this change in methods for writing servo signal for the purpose of obtaining narrower tracks and with the improvement in quality of the magnetic tape itself, the demand in quality for servo signal became stricter. Therefore, further improvement in the measurement precision of the servo signal is demanded in a device for inspecting quality of the servo signal.

It is therefore desired to provide a servo signal inspecting device and a method for evaluating quality of the servo signal by measuring the servo signal with a sufficient resolution, even when narrower data bands are made on the magnetic tape.

SUMMARY OF THE INVENTION

In an aspect of the present invention, there is provided a servo signal inspecting device for inspecting quality of a timing based servo signal recorded on a magnetic tape including: a servo signal inspecting head for reading the timing based servo signal recorded on the running magnetic tape; a peak detecting means for detecting pulse peaks from the timing based servo signal; a time interval measuring means for measuring a time interval of the detected pulse peaks by comparing timing of the pulse peaks with a standard clock signal; and an inspection means for inspecting quality of the timing based servo signal based on the time interval of the detected pulse peaks, wherein a period T [s] of the standard clock signal used in the time interval measuring means and a running speed v [m/s] of the magnetic tape at the servo signal inspecting head satisfy the following relationship: T×v<80 nm.

According to the present invention, by satisfying the relationship T×v<80 nm where T [s] is a period of the standard clock signal used in the time interval measuring means and v [m/s] is a running speed of the magnetic tape at the servo signal inspecting head, it becomes possible to measure the servo signal written on the magnetic tape with a sufficient resolution, to thereby inspect and evaluate quality of the servo signal.

With the use of the device of the present invention for inspecting servo signal on magnetic tape, it becomes possible to measure with a sufficient resolution and evaluate quality of the TBS signal written on the magnetic tape, even in the case of the magnetic tape to which narrower tracks are introduced in order to meet the demand for higher capacity.

With the use of the method of the present invention for inspecting servo signal on magnetic tape, it becomes possible to measure with a sufficient resolution and evaluate quality of the TBS signal written on narrower tracks on the magnetic tape, even in the case of the magnetic tape to which narrower tracks are introduced in order to meet the demand for higher capacity.

Other features, features and advantages of the present invention will become apparent upon reading the following specification and claims when taken in conjunction with the accompanying drawings.

BRIEF DESCRIPTION OF THE DRAWINGS

The various aspects, other advantages and further features of the present invention will become more apparent by describing in detail illustrative, non-limiting embodiments thereof with reference to the accompanying drawings, in which.

DETAILED DESCRIPTION OF THE PREFERRED EMBODIMENTS

Figure 1:
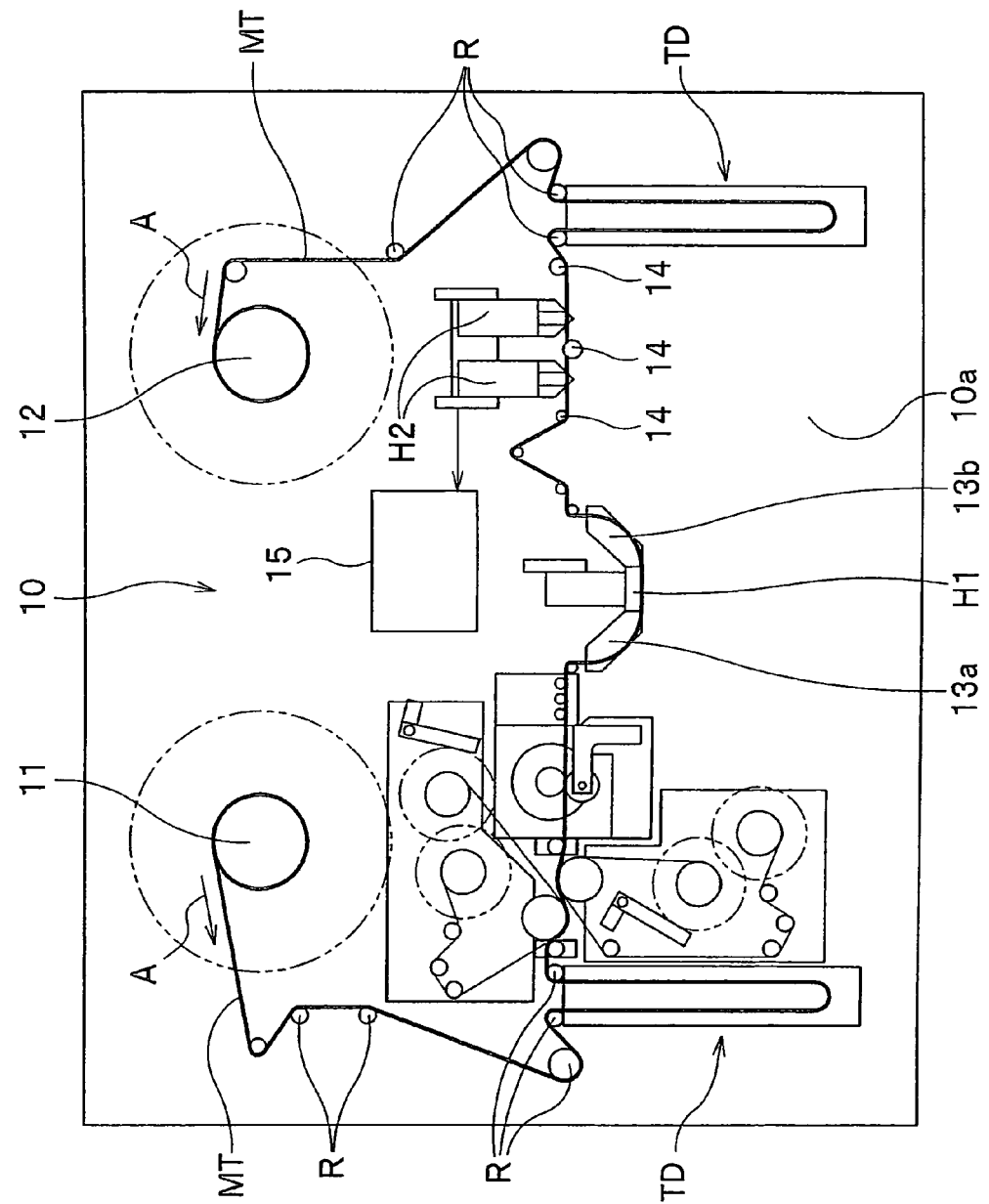
FIG. 1 is a schematic plan view showing an outline of a servo writer according to an embodiment of the present invention.

Referring to FIG. 1, the servo writer 10 includes a feed reel 11 for feeding a magnetic tape MT; and a take-up reel 12 for taking up the magnetic tape MT fed from the feed reel 11. A servo signal write head H1 and servo signal inspecting heads H2 are disposed downstream of the feed reel 11 in this order. Tape guides 13a and 13b are disposed upstream and downstream of the servo signal write head H1, respectively, each of which guides the magnetic tape MT while regulating the movement of the magnetic tape MT in a width direction, in order to make the magnetic tape MT abrasively run on the servo signal write head H1. In addition, in the vicinity of the servo signal inspecting heads H2, guides 14, 14 . . . are provided in order to make the magnetic tape MT run along the servo signal inspecting heads H2. Further, the servo signal inspecting heads H2 are connected to a servo signal inspecting part 15 in which quality of the servo signal written on the magnetic tape MT by the servo signal write head H1 is evaluated. The servo signal inspecting heads H2 read the servo signal on the magnetic tape MT, and send the servo signal to the servo signal inspecting part 15. The servo signal inspecting part 15 inspects quality of the servo signal, and evaluates the servo signal based on a predetermined inspection standard. The servo writer 10 further includes various apparatuses, such as a tension regulating apparatus (not shown) to adjust the tension of the magnetic tape MT to a predetermined value; tension detecting apparatuses TD; and guide rollers R.

Figure 3:
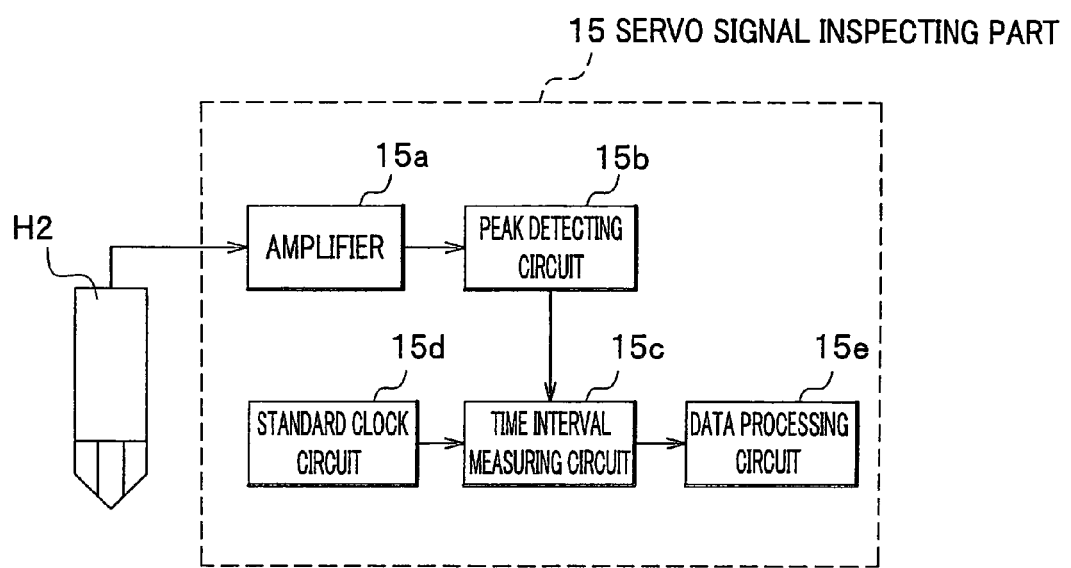
FIG. 3 is a schematic view showing components of a servo signal inspecting part of the servo writer.

As shown in FIG. 3, for example, the above-mentioned servo signal inspecting part 15 includes: an amplifier 15a that amplifies the servo signal read from the magnetic tape MT by the servo signal inspecting heads H2; a peak detecting circuit 15b that detects pulse peaks of the servo signal; a time interval measuring circuit 15c that measures time interval between peak signals corresponding to the detected pulse peaks; a standard clock circuit 15d that supplies a standard clock signal to the time interval measuring circuit 15c; and a data processing circuit 15e that evaluates quality of the servo signal based on the measured time interval between the peak signals.

The amplifier 15a is a circuit for amplifying the servo signal inputted from the servo signal inspecting head H2 so that the servo signal to be inputted in the peak detecting circuit 15b has predetermined signal strength.

With respect to the peak detecting circuit 15b, various types can be used, including a circuit in which the input signal is analogue-wise differentiated and the zero cross point obtained is taken as a peak position; and a circuit in which the input signal is subjected to A/D conversion and the peak position is digitally detected.

The time interval measuring circuit 15c is a circuit that compares the standard clock signal from the standard clock circuit 15d with the timing of peak signals detected by the peak detecting circuit 15b, and count the number of the clock peaks between the peak signals, to thereby obtain a time interval based on the number of the counted clock peaks.

For the standard clock circuit 15d, an oscillation circuit or element can be used in which a frequency of the normal vibration of a crystal oscillator, multivibrator and the like is divided to generate a standard clock signal of a predetermined frequency. In general, a rectangular pulse signal of 500 MHz±25 MHz is used, depending on the time interval of the servo signal patterns written on the magnetic tape MT, the desired measurement accuracy, the resolution and the like.

Figure 2A:
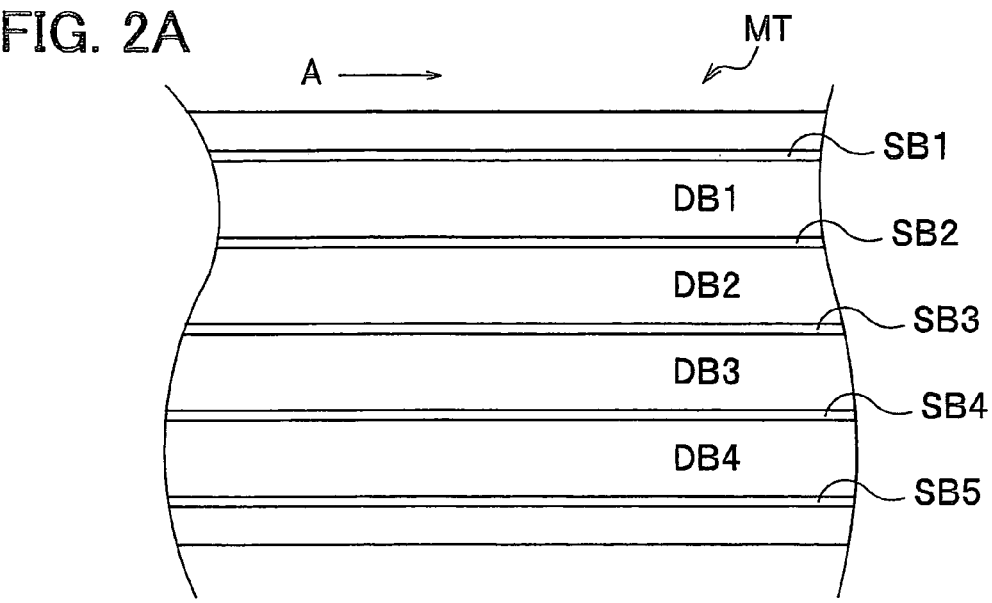
FIG. 2A is a schematic view showing servo bands.
Figure 2B:
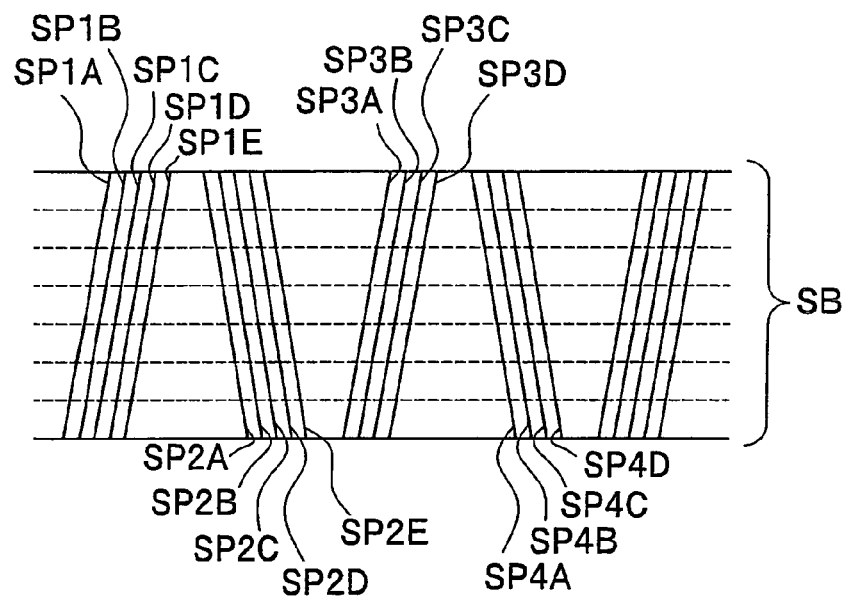
FIG. 2B shows servo patterns of TBS signal.

The data processing circuit 15e inspects and evaluates quality of the servo signal written on the magnetic tape MT by the servo signal write head H1, based on the time interval of the peak signals measured by the time interval measuring circuit 15c. For example, reference is made to FIG. 2B, where one unit of a servo signal is formed of a nonparallel pair of servo pattern sets each set composed of 5 servo patterns (SP1A, SP1B, SP1C, SP1D and SP1E; and SP2A, SP2B, SP2C, SP2D and SP2E), and another non-parallel pair of servo pattern sets each set composed of 4 servo patterns (SP3A, SP3B, SP3C and SP3D; and SP4A, SP4B, SP4C and SP4D), which unit is written on the magnetic tape at a predetermined spacing along a running direction A of the magnetic tape MT. An example of preferable servo signal includes a servo signal which is written on a servo band magnetized by direct current in one direction along a longer side of the servo band with the servo signal being magnetized in a direction opposite to the direction of the servo band. Since a change rate and change amount of a magnetic field is large over the boundary line between the base (background) portion of the servo band magnetized in one direction and the servo pattern magnetized in the opposite direction, an output of the servo signal becomes high. Accordingly, the S/N ratio of the servo signal is improved, and a higher capacity in the magnetic tape can be attained. Moreover, in the case of such a servo signal with the improved S/N ratio, it is preferred that the first servo pattern set be formed across a width of the servo band at an angle from 8 to 20 degrees with respect to the width, and the second servo pattern set be formed across the width of the servo band in non-parallel with the first servo pattern set, independently in each pair of the above-mentioned unit. With this conformation, the resolution of servo signals in the width direction of the servo band can be improved. It should be noted that there is no limitation with respect to the number of servo patterns included in a set in each pair, as long as the numbers in the set are different between the first pair and the second pair (in the present embodiment, 4 and 5, for example).

Figure 2C:
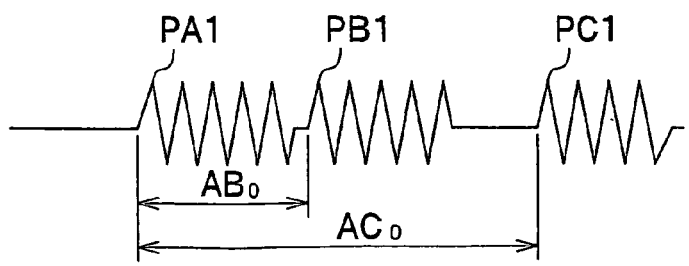
FIG. 2C illustrates time interval between pulse peaks.

With respect to such a servo signal, the inspection and the evaluation of quality are conducted by measuring the interval between the servo pattern set SP1A, SP1B, SP1C, SP1D and SP1E and the servo pattern set SP2A, SP2B, SP2C, SP2D and SP2E, and the interval between the servo pattern set SP1A, SP1B, SP1C, SP1D and SP1E and the servo pattern set SP3A, SP3B, SP3C and SP3D, by means of the time interval of the pulse peaks of the servo signals reproduced by the servo signal inspecting head. For example, as shown in FIG. 2C, time intervals are measured, such as a time interval $AB_0$ between the pulse peak PA1 in the servo pattern SP1A and the pulse peak PB1 in the servo pattern SP2A, and a time interval $AC_0$ between the pulse peak PA1 in the servo pattern SP1A and the pulse peak PC1 in the next servo pattern SP3A. Subsequently, the ratio $AB_0/AC_0$ is calculated, and in accordance with the results, an inspection is made with respect to whether the result fits to the standard established with the magnetic tape MT, which in turn gives the evaluation of quality of the servo signal.

In the present invention, the period T [s] of the standard clock signal used in the time interval measuring circuit 15c, and the running speed v [m/s] of the magnetic tape at the above-mentioned servo signal inspecting head H2, i.e., the running speed v [m/s] of the tape running system, are adjusted so that the following relationship is attained: T×v<80 nm. By satisfying this relationship, the minimum resolution of the measurement precision of the servo signal of the magnetic tape MT becomes 100 nm or less, and therefore, the magnetic tape having a narrow track pitch, especially a magnetic tape having a data band with a track pitch of 20 μm or less, can be inspected and evaluated with a sufficient precision. For example, in the case where the tape speed is 5 m/s, it is desired that T be less than 16 [ns], i.e. the frequency of the standard clock be 63.5 MHz or more. It is more desirable that T be less than 12.5 [ns], i.e. the frequency of the standard clock be 80 MHz or more.

Figure 4:
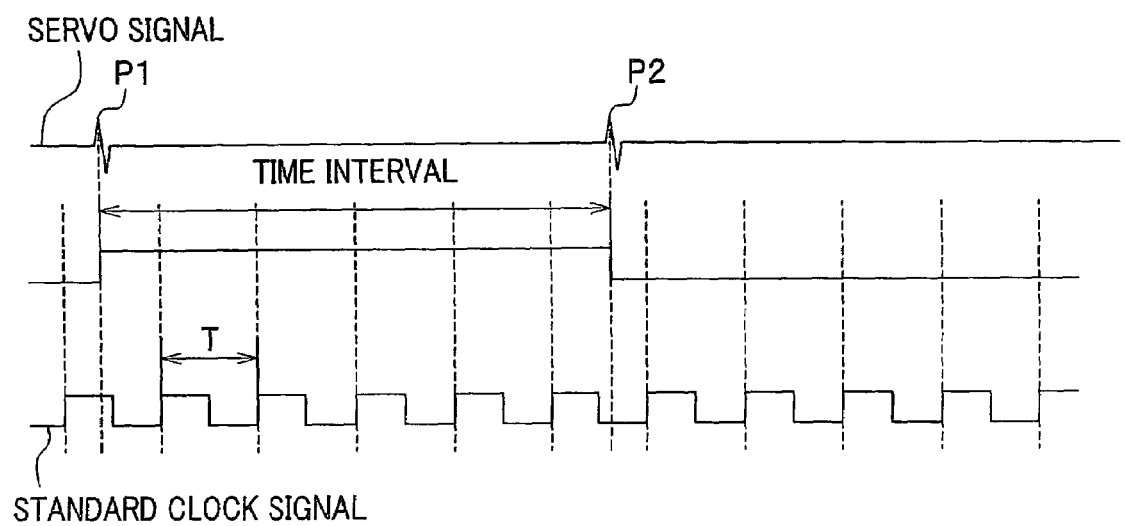
FIG. 4 shows a relationship between timing of pulse peaks of servo signal and a standard clock.

In the case where the time interval between the pulse peak P1 and the pulse peak P2 is measured in the time interval measuring circuit 15c of the servo signal inspecting part 15, the peak signals P1 and P2 of the servo signal detected by the peak detecting circuit 15b are compared with the clock signal from the standard clock circuit 15d (see FIG. 4). When the number of the complete standard clock signal having a period of T [s] between the peak signals P1 and P2 turned out to be n (in FIG. 4, approximately 4), the time interval between the peak signals P1 and P2 is defined as nT [s].

The running speed v can be controlled by adjusting either of the tape delivery speed in the tape running system, such as a take-up speed of the tape by the take-up reel 12, tension of the guide roller R, a feed speed of the capstan motor.

The period of the standard clock signal can be controlled by adjusting clock frequency in the standard clock circuit 15d.

What is claimed is:

1. A servo signal inspecting device for inspecting quality of a timing based servo signal recorded on a magnetic tape comprising:
   a servo signal inspecting head for reading the timing based servo signal recorded on the running magnetic tape;
   a peak detecting means for detecting pulse peaks from the timing based servo signal;
   a time interval measuring means for measuring a time interval of the detected pulse peaks by comparing timing of the pulse peaks with a standard clock signal; and
   an inspection means for inspecting quality of the timing based servo signal based on the measured time interval of the pulse peaks,
   wherein a period T [s] of the standard clock signal used in the time interval measuring means and a running speed v [m/s] of the magnetic tape at the servo signal inspecting head satisfy the following relationship: T×v<80 nm.

2. The device according to claim 1, wherein a track pitch of a data signal to be recorded on the magnetic tape for recording the timing based servo signal is 20 μm or less.

3. The device according to claim 1, wherein, in order to satisfy the relationship: T×v<80 nm, the device further comprises:
   a speed control means for adjusting the running speed by adjusting a tape delivery speed of the servo signal inspecting device; and
   a clock control means for adjusting clock frequency of the standard clock signal.

4. A method for inspecting servo signal comprising:
   reading a timing based servo signal recorded on a running magnetic tape;
   measuring a time interval of pulse peaks detected from the timing based servo signal by comparing timing of the pulse peaks with a standard clock signal;
   inspecting quality of the timing based servo signal based on the measured time interval of the pulse peaks,
   wherein a period T [s] of the standard clock signal and a running speed v [m/s] of the magnetic tape satisfy the following relationship: T×v<80 nm.

5. The method according to claim 4, wherein the timing based servo signal recorded on the magnetic tape is written on a servo band magnetized by direct current in one direction along a longer side of the servo band with the servo signal being magnetized in a direction opposite to the direction of the servo band.

6. The method according to claim 5, wherein the timing based servo signal recorded on the magnetic tape comprises at least one unit comprising two non-parallel pairs of servo pattern sets, each pair independently composed of:
   a first servo pattern set being formed across a width of the servo band at an angle from 8 to 20 degrees with respect to the width; and
   a second servo pattern set being formed across the width of the servo band in non-parallel with the first servo pattern set.

7. The method according to claim 6, wherein the width corresponds to a longitudinal running direction of the magnetic tape.

8. The method according to claim 4, wherein, in order to satisfy the relationship: T×v<80 nm, the method further comprises:
   adjusting the running speed by adjusting a tape delivery speed of the servo signal inspecting device; and
   adjusting clock frequency of the standard clock signal.

9. A servo signal inspecting device for inspecting quality of a timing based servo signal recorded on a magnetic tape comprising:
   a servo signal inspecting head for reading the timing based servo signal recorded on the running magnetic tape;
   a peak detecting circuit for detecting pulse peaks from the timing based servo signal;
   a time interval measuring circuit for measuring a time interval of the detected pulse peaks by comparing timing of the pulse peaks with a standard clock signal; and
   an inspection circuit for inspecting quality of the timing based servo signal based on the measured time interval of the pulse peaks,
   wherein a period T [s] of the standard clock signal used in the time interval measuring circuit and a running speed v [m/s] of the magnetic tape at the servo signal inspecting head satisfy: T×v<80 nm.

10. The servo signal inspecting device according to claim 9, wherein a track pitch of a data signal to be recorded on the magnetic tape for recording the timing based servo signal is 20 μm or less.

11. The servo signal inspecting device according to claim 9, wherein, in order to satisfy the relationship: T×v<80 nm, the device further comprises:
   a speed control circuit which adjusts the running speed by adjusting a tape delivery speed of the servo signal inspecting device; and
   a clock control means which adjusts clock frequency of the standard clock signal.

* * * * *